(12) United States Patent
Beyer et al.

(10) Patent No.: US 6,486,435 B1
(45) Date of Patent: Nov. 26, 2002

(54) DEVICE AND METHOD FOR STRUCTURING THE SURFACE OF FLOOR COVERINGS WHICH HAVE ALREADY BEEN LAID

(75) Inventors: Eckhard Beyer, Weissig (DE); Jan Hauptmann, Eibau (DE); Günter Wiedemann, Dresden (DE)

(73) Assignee: Fraunhofer-Gesellschaft zur Forderung der Angewandten Forschung e.V., Munich (DE)

( * ) Notice: Subject to any disclaimer, the term of this patent is extended or adjusted under 35 U.S.C. 154(b) by 0 days.

(21) Appl. No.: 09/673,549

(22) PCT Filed: Apr. 14, 1999

(86) PCT No.: PCT/DE99/01129

§ 371 (c)(1),
(2), (4) Date: Dec. 19, 2000

(87) PCT Pub. No.: WO99/52670

PCT Pub. Date: Oct. 21, 1999

(30) Foreign Application Priority Data

Apr. 14, 1998 (DE) .......................... 198 16 442

(51) Int. Cl.[7] .............................................. B33K 26/38
(52) U.S. Cl. ............................ 219/121.8; 219/121.68; 219/121.69
(58) Field of Search ...................... 219/121.6, 121.78, 219/121.8, 121.68, 121.69

(56) References Cited

U.S. PATENT DOCUMENTS

| | | | |
|---|---|---|---|
| 4,794,222 A | | 12/1988 | Funayama et al. |
| 5,006,694 A | * | 4/1991 | Handke et al. ........ 219/121.84 |
| 5,409,537 A | * | 4/1995 | Poullos et al. ........... 219/121.8 |
| 5,643,476 A | | 7/1997 | Garmire et al. |
| 5,780,806 A | * | 7/1998 | Ferguson et al. ...... 219/121.68 |
| 6,167,879 B1 | * | 1/2001 | Sievers et al. |
| 6,180,913 B1 | * | 1/2001 | Kolmeder et al. ..... 219/121.68 |

FOREIGN PATENT DOCUMENTS

| | | | |
|---|---|---|---|
| DE | 19518270 | | 8/1996 |
| DE | 29802069 U1 | * | 3/1998 |
| JP | 4-182093 A | * | 6/1992 |
| WO | WO-96/36469 A | * | 11/1996 |
| WO | WO 97/48536 | | 12/1997 |

OTHER PUBLICATIONS

Soliton, Neuheiten aus der Laser- und Messetechnik, Heft 10 (Apr. 1995).*

* cited by examiner

Primary Examiner—Geoffrey S. Evans
(74) Attorney, Agent, or Firm—Leydig Voit & Mayer, Ltd.

(57) ABSTRACT

The invention relates to a device and method for structuring the surface of floor coverings which have already been laid, comprising various floor coverings which may also consist of mineral materials such as natural or artificial stone. The object of the invention is to provide floor coverings which have already been laid with a structure on their surface, which structure makes it possible to at least increase the nonslip properties even in the presence of slippy media, e.g. water. To do this, the invention uses a device with which at least one laser beam can be moved with controlled intensity and in at least one dimension across the surface to be structured, the elements for guiding and shaping the laser beam(s) being accommodated in a mobile part of the device, so that this mobile part is guided intermittently or continuously across the floor surface which is to be structured and, in the process, the structuring can be formed by means of the laser beam.

33 Claims, 6 Drawing Sheets

DEVICE AND METHOD FOR STRUCTURING THE SURFACE OF FLOOR COVERINGS WHICH HAVE ALREADY BEEN LAID

The invention relates to a device and a method for structuring the surface of floor coverings which have already been laid. With this method and device, it is possible to provide virtually any materials used for floors with structures on their upper, preferably smoothed surface, these structures increasing and improving the nonslip properties and, if appropriate, the aesthetic appearance.

Various methods are known for increasing the nonslip properties of floors in which the surface is machined or influenced by wet-chemical means, in order to influence the nonslip properties of floors, in particular made from natural stone, artificial stone, plastics or other plastics-sealed or coated coverings of the desired form.

In addition, DE 195 18 270 C1 has described a nonslip floor covering and a method for producing it. A floor covering of this type, which is to have a highly polished surface, is provided with lenticular and sharp-edged microcraters by pulsed laser firing, the intention being that the microcraters should have a sucker action and these microcraters being made in a size which means that they are not visible to the human eye. The microcraters are to be randomly distributed and produced in an irregular arrangement. These microcraters are said to increase the coefficient of friction of a floor covering of this type to over 0.4.

This prior publication reveals that the microcraters are to be formed on the surface of in particular mineral floor covering materials in a stationary installation by means of a pulsed Nd:YAG laser. Consequently, it is only possible for suitably treated coverings to be fitted in new buildings or as newly laid floors, while the potential danger which exists on floors which have already been laid remains. Moreover, it is customary for floor coverings which have already been laid to be remachined, i.e. ground down after prolonged periods, in particular in the case of stone floor coverings, in order to restore the visual appearance and, in particular, the shine. This naturally leads to the desired effect of the microcraters, as a result of their dimensions in terms of shape and depth being at least reduced, being eliminated together with the desired nonslip effect.

Furthermore, Wo 97/48536 A1 describes how various jointing materials and mortars can be removed from joints between tiles and bricks by means of laser beams using a mobile unit. The mobile unit with a housing can be moved both manually and using a robot. To effect the movement, wheels are present on the housing by means of which a laser beam in protected form is directed onto the jointing material to be removed, which is situated in joints between tiles, for example, and is to be removed again.

Therefore, the object of the invention is to propose a possible solution for providing floor coverings which have already been laid with a structure on their surface, which structure at least increases the nonslip properties on the surface even when a slip-promoting medium, such as for example water, is present.

According to the invention, this object preferably is achieved by means of the characterizing features of the invention. Advantageous embodiments and refinements of the invention will be apparent from the description provided herein.

The device according to the invention and the corresponding method can be used for virtually any floor coverings which consist of a very wide range of materials, and shaping the one or more laser beam(s) are accommodated.

According to the invention, it is possible to use laser light sources which operate either continuously or in pulsed manner. In this context, it is certainly expedient to use a continuously operating laser beam if linear structures are to be formed in the surfaces of the floor covering and to use a pulsed laser beam if punctiform structures are to be formed. The appropriate laser light source may be selected appropriately according to the floor covering material and in particular taking into account its absorption properties for the wavelengths of the laser used.

In addition to $CO_2$ lasers, these lasers include Q-switched pulsed lasers, such as an Nd:YAG laser, which is preferably diode-pumped.

To guide and shape the beam, it is possible to use optical elements which are known from laser technology, such as mirror systems, beam-widening lenses, planar field optics, scanners or polygon wheels, these optical elements preferably being designed or arranged in such a way that it is possible to control in particular the laser beam intensity on the surface of the floor covering. Systems of this type are known from laser marking.

It is particularly advantageous to use optical fibers to transmit the laser beam or a plurality of laser beams from one or more laser light sources to the point of action. This is particularly expedient if the device comprises a plurality of parts and that part of the device in which the laser light source together with the additional components required for its operation, such as for example the cooling system and the power supply, are separated from the mobile part of the device. Designing the device according to the invention in this way is particularly advantageous for machining steps, since the flexibility and ease of handling of the mobile part of the device which contains the elements for guiding and shaping the laser beam(s) can be made correspondingly small both in terms of mass and in terms of volume.

In this case, this mobile part may have its own drive, by means of which it can be moved at a predeterminable speed over the surface to be structured, so that deflecting the laser beam(s) in only one dimension is sufficient to form the desired structure pattern on the surface of the floor covering. In addition, however, it is possible to carry out a speed measurement, for example using an undriven wheel, as is known from Peiβler, and to take the speed measurement signal into account when controlling the laser beam. If the device according to the invention is designed in this way, it is possible to achieve continuous operation. The procedure should be similar for manual operation without a dedicated drive for the mobile part.

However, the procedure using the invention may also involve certain areas of the surface being structured one by one, after the mobile part has been suitably positioned, in a so-called step-by-step process. In this case, it is necessary to deflect the laser beam in two dimensions. A procedure of this nature is recommended in particular when a floor covering which is to be treated accordingly, comprising individual elements (slabs) of virtually identical dimensions which are separated from one another by joints, is to be structured.

To control the movement or the positioning of the mobile part, it is possible to provide a guidance, navigation and/or image-processing system on the mobile part of the device according to the invention, which may be operated in conjunction with an electronic data-processing unit. An electronic data-processing unit of this type can store corresponding data about the dimensions, geometric configuration and material of the floor covering, and this data can be taken into account for controlling the movement of the mobile part of the device according to the invention and the laser intensity. Moreover, an electronic control unit of this nature can also be used to influence the shape and dimensioning of the structure formed on the surface of the floor covering. It is therefore readily possible to design structuring in the form of microcraters which act as displacement space for slip-promoting media of a size which is not visible to the human eye at a distance of at least 1 meter and therefore scarcely affects the visual appearance of the surface.

However, to achieve the desired nonslip effect, the structuring does not have to be formed over the entire surface of the floor covering, but rather it is possible to form structured regions in the form of a raster, in which structured areas are separate from unstructured areas. The shape of the structured areas may, for example, be square or circular. However, the distances between the structured areas should be selected in such a way that the safety when the floor covering is walked upon is almost as great as if the entire surface were to be structured. An embodiment of this nature reduces the machining time required for a floor covering to be structured.

Moreover, the machining speed can be increased if a plurality of laser beams are used. In this case, for cost reasons it is particularly expedient for the laser beam from a single laser light source to be split into at least two laser beams which can be used for structuring, using at least one beam splitter. Recently, beam splitters which enable a laser beam to be split not just into two part-beams, but rather into three individual beams or, with beam splitter systems, into even more individual beams, have recently become known. In any event, however, the part-beams have to be deflected and shaped separately in order to form the structuring in the desired shape.

However, in addition to the virtually invisible microstructuring, it is also possible to form structuring which is visible to the human eye and may be formed, for example, as a regular pattern or in the form of predeterminable pictorial representations. Pictorial representations of this type may be used, for example, for advertising purposes. By suitably influencing the laser beam machining with regard to intensity and machining time, it is readily possible to obtain pictorial representations on the floor covering surface which, through a variable structure size and structure depth, give the impression of a three-dimensional effect.

At least one proximity sensor should be present on the device according to the invention, at least on the mobile part, which sensor measures the distance from the surface to be structured, in particular for focusing the laser beam, and this measurement signal is used to guide and shape the beam and/or to control the laser power.

This proximity sensor or at least one additional proximity sensor may moreover be used to monitor or control the movement of the mobile part of the device according to the invention. In this case, proximity sensors of this type are used to continuously or discontinuously measure the distance from walls, parts of buildings (e.g. columns) or other objects arranged on a floor. The actual distance measured can be compared to the stored values and used for navigation and controlling the movement.

However, at least one proximity-measuring device may also be used for an emergency switch-off, for example if the mobile part is kiltered by a certain angle, so that there may be a risk to people and objects situated in the vicinity. In this case, when a predetermined limit value is exceeded, as measured with a proximity-measuring device of this type, the laser light source can be switched off.

However, it is also possible for other additional sensors or switches, such as for example inclination sensors, to be used for this purpose. However, safety switches may also be arranged on a protective guard surrounding the actual working area, these switches preventing the device from operating when the protective device is open or has been removed.

If only one or only two proximity sensor(s) is/are used, at least one should be rotatable about at least one axis and, in addition, the corresponding angle should be determined by means of a conventional rotation-angle sensor and should be taken into account when evaluating the proximity signal.

Since, in particular for structuring mineral materials, such as the wide range of natural stones, solid particles break off and are thrown outward under considerable acceleration, it is expedient for a protective device for the optical elements for guiding and shaping the laser beam(s) in the beam direction to be arranged on the mobile part of the device according to the invention. In this case, the protective panels which are transparent to the particular laser radiation used and are preferably exchangeable may be used. It may also be expedient to use a protective panel in which there is a longitudinal incision through which the laser beam which has been deflected in one dimension is directed unimpeded, i.e. without transmission losses, onto the surface to be structured.

The thickness of the protective panel and the width of a longitudinal incision of this nature should be dimensioned in such a way that it is impossible for any particles of the floor covering material which is to be structured to be able to reach and damage the optical elements.

Another possible option for protecting these elements consists in using a sheet which is conveyed continuously by being wound up onto and unwound from reels. A transparent sheet of this type is sufficiently strong, and its flexibility ensures that the kinetic energy of the particles is absorbed and there is no possibility of the particles breaking through the sheet. The use of a continuously moving sheet of this type has the additional advantage that the transmission remains virtually constant and there is no possibility of deterioration caused by scratches and dirt, as may be the case with transparent protective panels.

It is also possible, on its own or in addition, to use a suction system for these particles, in which case it is possible, for example, to use a so-called cross-jet suction system.

It may also be advantageous to set a pressure which is above ambient pressure in the closed area in which the optical elements for guiding and shaping laser beams are arranged, in order to at least limit contamination caused by penetrating dust.

Moreover, the invention may also be formed by providing or using a separate image-processing system or the image-processing system which has already been mentioned for controlling the movement of the mobile part of the device to record the structure which is formed by means of the laser machining and to carry out a corresponding quality control.

Particularly in the case of relatively highly reflective materials, to increase the machining speed it may be appropriate to provide a surface of this type with a layer of a medium of higher absorption for the laser radiation used before the structures are formed. In this case, it is possible for sheets, liquid or pasty media to be temporarily applied in a relatively smaller layer thickness to the floor covering which is to be structured.

It is advantageous not only in this case for the device according to the invention to be provided with an integral cleaning device which can also be used to remove the particles which have broken off the floor covering material.

The cleaning may be achieved by using liquid cleaning agents in conjunction with conventional mechanical elements, such as brushes or sponges, or on their own or in combination with wet cleaning by means of a suitable suction device, which in turn may act in combination with the cross-jet system which has already been mentioned.

In the case of wet cleaning, it may be advantageous to utilize the thermal energy of the cooling water and/or of the cooling air for the laser light source, in which case either heat exchangers which are already present or heat exchangers which are to be additionally fitted should be used for this purpose.

For process control, it is possible to provide plasma monitoring on the mobile part of the device according to the invention, which is used to measure the temperature and/or the size of the plasma formed by the laser beam on the surface and to control in particular the intensity of the laser beam.

It is possible to set or control the laser parameters, such as the laser power, pulse energy, pulse frequency and/or the laser beam parameters, such as beam widening, focal length, active spot diameter, on their own or in combination with the machining speed (line feed) and the feed rate of the device. Since fluctuations in the reflective or absorption properties over the surface to be structured occur in particular when machining natural or artificial stones, it is expedient to provide an additional optical measuring system on the mobile part of the device according to the invention, which is used to determine the reflection or absorption in a positionally-resolved manner, and this measurement is taken into account when controlling the intensity of the laser beam(s).

The invention is to be explained in more detail below with reference to examples. In the drawing.

Figure 5:
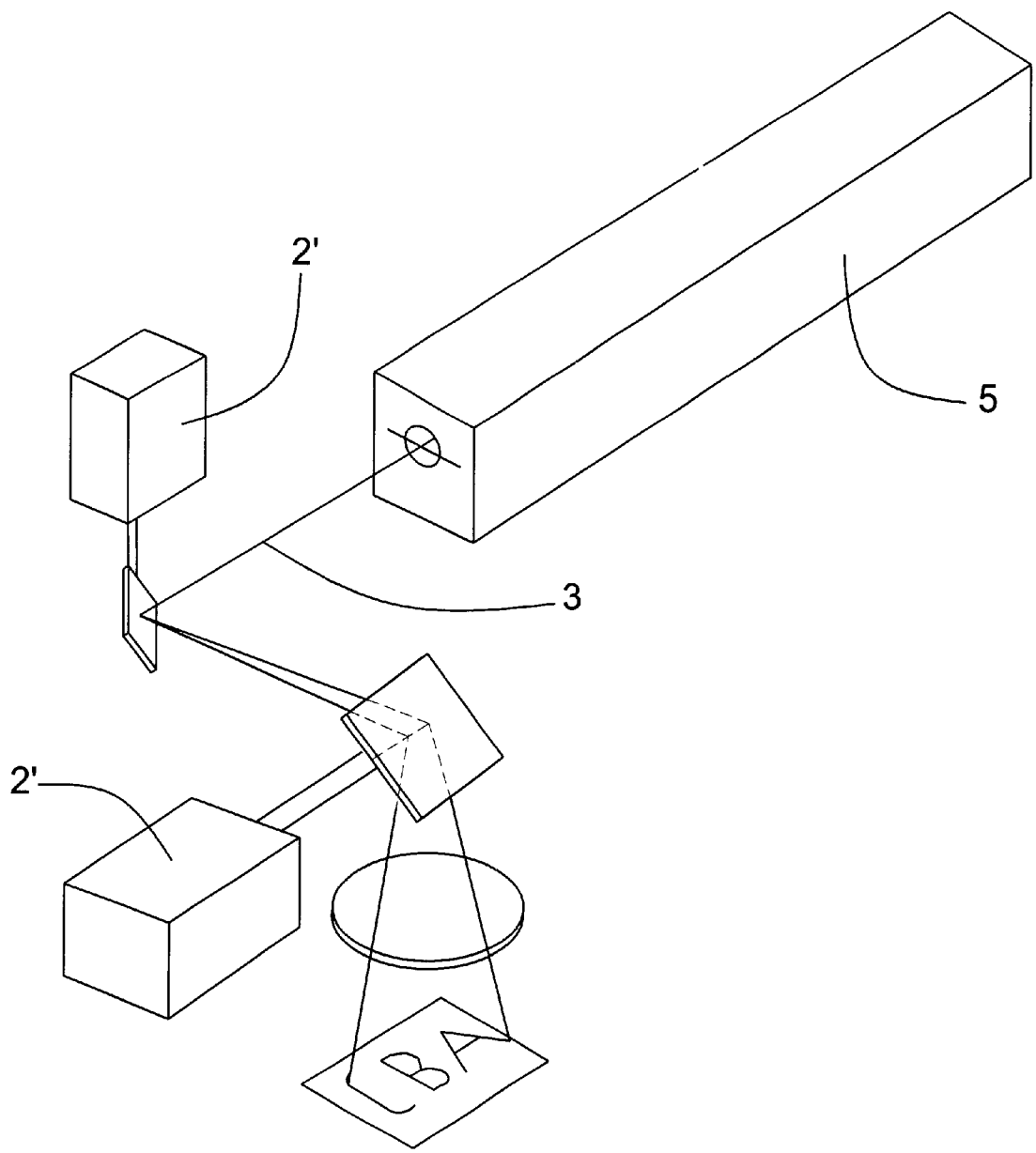

FIG. 5 diagrammatically depicts vectorial deflection of laser beams, and

Figure 6:
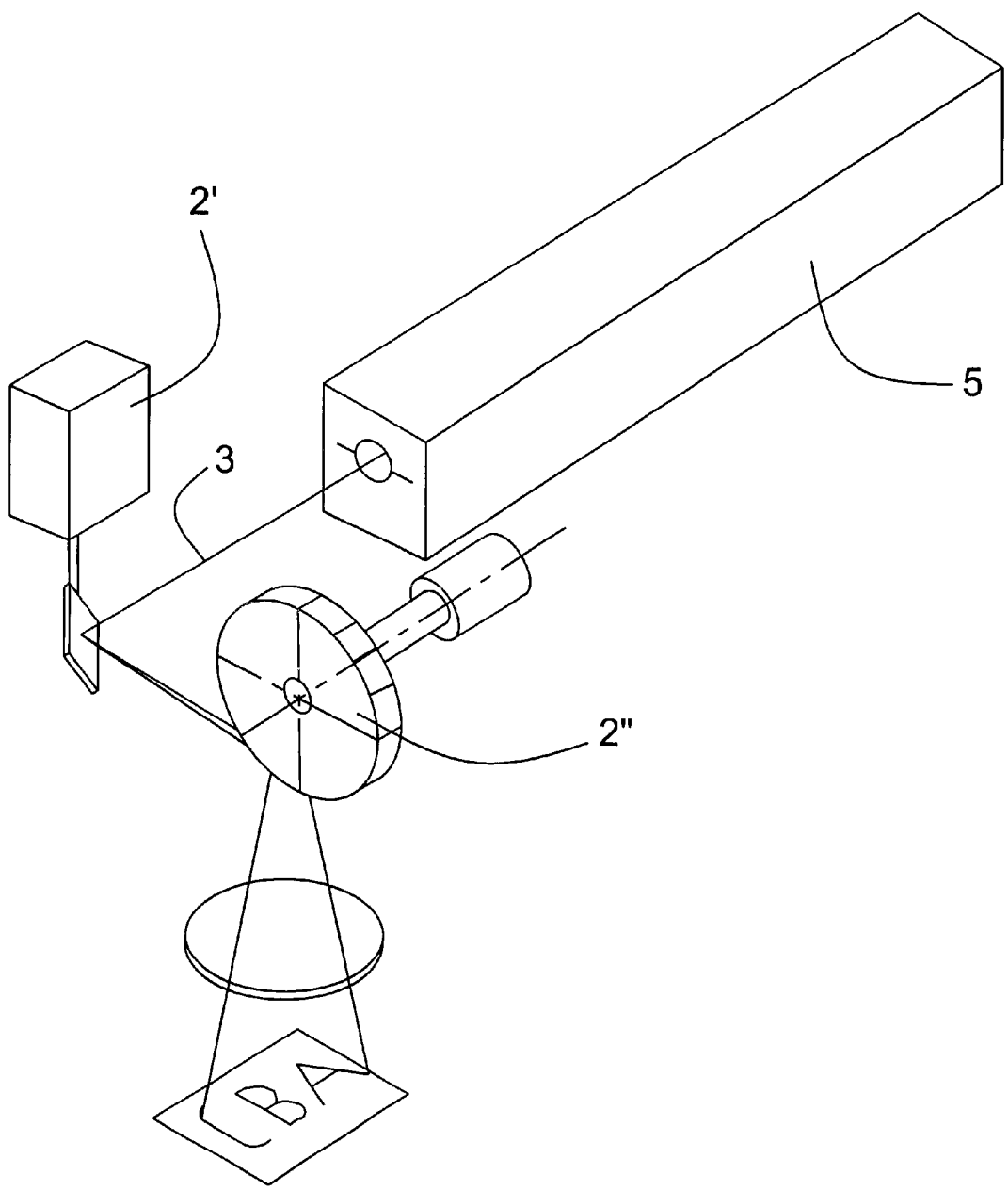

FIG. 6 diagrammatically depicts raster deflection of laser beams.

EXAMPLE 1

In this example, the device according to the invention is to be used as a mobile installation for increasing the nonslip properties of polished natural stone surfaces.

Floors of this type are laid in the entry areas to, for example, banks, public buildings, airports, hotels, etc., comprising flat individual slabs in sizes of 300×300 mm. One example of a customary material is granite.

An installation of this type may comprise a plurality of components, such as at least one frame 19, if appropriate with travelling unit 11 and electric drive, laser 5, galvo scanner 2, cooling system 17, power supply unit 16, an x-y displacement unit 9, beam protection unit 13, a protective device for the optics, an optical measurement system, a control unit 15 for the laser and x-y displacement unit, and a CCD camera 7 with a monitor.

The travelling unit used may be a three-wheeled unit with two unsteered wheels and one steerable wheel, of which advantageously at least one wheel, preferably the steerable wheel, can be driven by an electric motor. For steering, it is possible to use a joystick, as in a hand-guided forklift. The drive is used to assist with positioning and can be manipulated on its own or together with the steering mechanism by means of a programmable-memory control unit.

Laser 5 and galvo scanner 2 are in this case connected to one another and mounted on an x-y displacement unit 9.

In this example, a CW-diode-pumped Q-switched Nd:YAG solid-state laser and an x-y galvo scanner with planar field optics and adjustable zoom lens system (focal length of the lens system 300 mm) are used, this adjustment advantageously taking place as a function of the measured distance between the optics and the floor surface, the distance preferably being measured by optical means. In this example, the size of the scanned field is 150*150 mm. The laser beam is focussed onto the floor surface using the optics.

The laser and scanner parameters (e.g. current intensity, pulse sequence frequency, scanning rate) are set automatically by means of the control unit or selected manually according to the material, in this case for the type of granite, the corresponding predetermined parameters being recorded in the memory unit of the programmable-memory control unit. Fixed parameters are the dot spacing of 0.4 mm on the floor surface and the size of the scanned field.

On account of the scanned field size, the x-y displacement unit 9 is designed in such a way that to machine one individual tile, it is possible to move into four different positions, without any overlap, so that a constant distance between the dots (microcraters) is maintained even between the individually machined areas of a granite tile.

A beam protection device 13 which can be used has a housing which is open at the bottom and on the lower edges of which elastic lips are arranged. The housing may be arranged to be vertically displaceable on the frame 19. Prior to machining, the housing is lowered to the floor and covers the entire machining area (300×300 mm). The housing is connected to a safety switch which only enables the laser beam once the housing has been lowered. After an individual granite tile has been machined, the housing can be raised and lowered again once the device has been repositioned, so that it is possible to achieve the maximum possible laser beam protection (Class 1).

The CCD camera 7 enables the positioning and monitoring of the machining to be facilitated or made possible. Known image-processing means are used for alignment with respect to the edges of the individual tiles. A screen can be used for monitoring and, if appropriate, positioning. In the latter case, corresponding lines which have been preset for the edges of the tiles can be blended in on the screen and can be moved until they are congruent with the actual pixels indicating the edges of the tiles.

The protective device used for the optics may be an exchangeable protective glass in combination with a cross-jet suction system, which enable the optical elements to be protected from the process waste products while minimizing wear to the protective glass.

In this example, the machining takes place discontinuously at the individual tiles, after suitable positioning and onward movement.

It is possible to generate uniform patterns at the above-mentioned spacing raster of 0.4 mm and with crater diameters of between 100 and 400 µm, the depth of the structures being at most half as great.

However, is also possible to form visible structures with optical effects or as information carriers, in which case the dimensions of the individual craters may be greater or variable.

EXAMPLE 2

In this case, the intention is for polished natural stone surfaces, in particular made from granite, to be provided with nonslip structures; the surfaces may preferably be steps.

A device of this type is to have a transportable frame on which laser, cooling system and power supply are arranged. Furthermore, it is possible to use a control system for the self-supporting unit and the laser, tactile detection of the edge of the step and optics protection.

Moreover, a self-propelled unit with a scanner head, as a mobile part, is present, four wheels with an electric drive preferably being used for this purpose. The wheels may be oriented perpendicular to the direction of travel, in order to exert pressure for the tactile edge detection. The two wheels which lie closest to the edge of the step can be driven and may be rotated through a fixed angle with respect to the direction of travel.

The other two wheels may be attached so as to move freely.

The galvo scanner head is attached to the travelling unit with the wheels. The beam transmission takes place via optical fibers, and the scanner produces the movement of the laser beam at right angles to the direction of travel, so that the structure can be formed in two dimensions on the surface of the step if the travelling unit is moving parallel to the edge of the step.

Moreover, there is a measuring wheel for determining the drive speed, and. the speed measurement signal can be used for open-loop or closed-loop control of laser and scanner (scanning speed and pulse sequence frequency). As a result, it is possible to achieve a constant dot spacing in the raster, for example.

With the tactile edge detection, the mobile part is moved parallel to the edge of the step, and various step shapes can be machined.

Once again, a galvo scanner with planar field optics (focal length of the optics 160 mm) is used. The size of the scanned field is 100×100 mm, so that at least the particularly dangerous edge region of a step can be structured in one operation.

The width of the machined track may also be variably adjusted.

Once again, it is possible to use a CW-diode-pumped Q-switched Nd:YAG solid-state laser in combination with a programmable-memory control unit, as has already been described in Example 1.

To protect the optical elements, it is once again possible to use an exchangeable protective glass and encapsulation for the beam protection.

With a device of this type, the machining can be carried out continuously.

Once again, it is possible to form a uniform grid of points using the raster and structure measures described in Example 1. The width of a machining track may, for example, be 60 mm and may be formed at a distance of approx. 5 mm from the edge of the step, which may be sufficient, for the desired nonslip properties, by forming only one such track per step.

Figure 1:
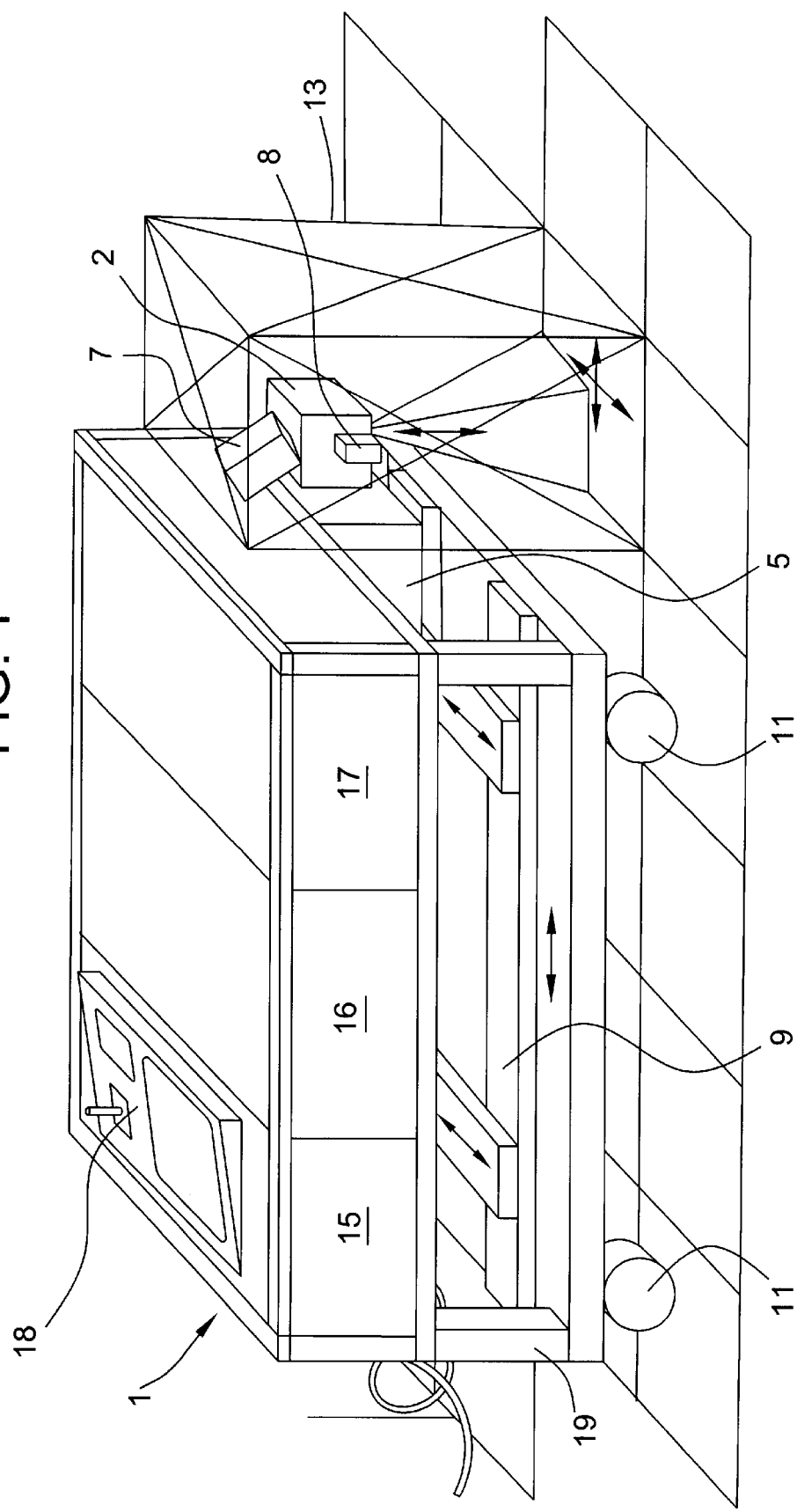
FIG. 1 shows an example of a device according to the invention which is particularly suitable for discontinuous operation.

FIG. 1 is intended to diagrammatically depict and clarify an example of a device which is suitable in particular for discontinuous machining of floor coverings.

In this example, the essential components required are accommodated in a mobile part 1. They are held by a frame 19 on which a travelling unit 11, in this case with four wheels, is arranged. In addition, the frame 19 accommodates the control unit 15, the power supply unit 16, the cooling system 17 for the laser 5 (not shown here) and a manually operable control panel 18. In addition, there is a power supply line 14 which is designed to be flexible in accordance with the mobility required.

Moreover, on the frame 19 there is a displacement element 9 which, in this example, allows displacement in two axes which are oriented perpendicular to one another, as indicated by the double arrows. The laser 5 and a galvo scanner head 2, as beam-guiding elements, and an electronic camera 7, the signals of which can be analysed using a conventional image-processing system, are attached to the displacement element 9, so that they can be displaced together in the x-y directions by means of the displacement element 9 and can be positioned, for example, in accordance with the pattern of individual slabs of a floor covering which have already been laid.

With a device of this type, the mobile part 1 is moved step by and, after an individual slab has been machined and an adjacent individual slab has been reached, the displacement element 9 is manipulated in such a way that a position is reached in which the corresponding individual slab can be machined in its entirety or over a controlled part.

In this example, there is a proximity sensor 8 on the galvo scanner head 2, as a beam-guiding element, which is used to determine the distance from the individual slab element which is to be machined. This proximity measurement signal is used primarily to influence a beam-shaping unit which is not shown here and which can be used to influence the focusing of the laser beam according to the actual distance. The proximity measurement signal can be measured during the movement of the displacement element 9, can be temporarily stored can then be taken into account in the control unit 15 during the machining of the individual slab.

The beam-shaping unit used may, for example, be a conventional vario-zoom lens system which is connected to the control unit 15.

The actual machining area, which in the example shown here is the area taken up by one slab-like individual element of a floor covering, should be surrounded by a protective device 13, so that it is possible to avoid any danger from the laser beam or from parts which are thrown out from the floor covering.

A safety contact switch or a suitable sensor should advantageously be present on a laser protection device 13 of this type, so that operation with the laser protection device 13 partially or completely removed is rendered impossible.

In the example of a device according to the invention shown in FIG. 2, the mobile part 1 again comprises a frame 19 in which the control unit 15, the power supply unit 16 and the cooling system 17 for the laser 5 are accommodated. In this example, however, the laser light source 5 and the beam-shaping and beam-guiding elements, in this case two adjacent galvo scanner heads 2, and the laser protection device 13 are rigidly attached.

Since these parts are attached to the frame 19 in a stationary position, in this case two proximity sensors 8 are also arranged in a stationary position and at a distance from one another. The two proximity sensors 8 arranged at a distance from one another allow even an individual slab of a floor covering which has been laid at an inclined angle to the horizontal to be machined without problems, since the corresponding angle of inclination can be determined using the two proximity sensors 8, an inclination in two directions which are perpendicular to one another also being detected, since the mobile part 1 moves along one of these two axes.

In this example too, a travelling unit 11 comprising four wheels has been used on the frame 19; the individual wheels of the travelling unit 11 should be driven individually. To determine the position and also to control the laser beams, an undriven measuring wheel 12 is used. As a result, the corresponding speed can be measured-without slippage.

Figure 2:
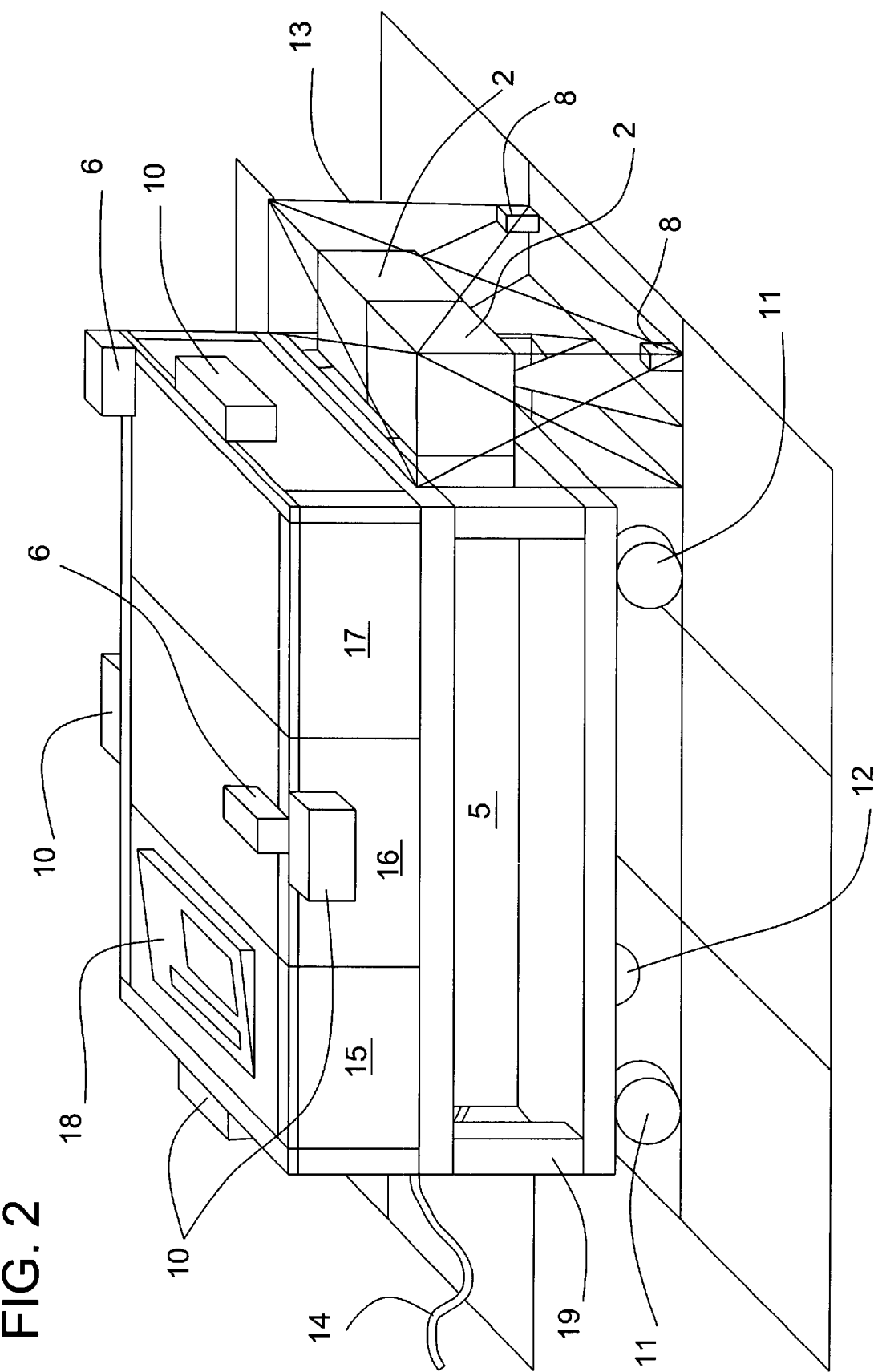
FIG. 2 shows an example of a device according to the invention which is particularly suitable for continuous operation.

In the example shown in FIG. 2, collision-prevention devices 10 are present on each outer side of the mobile part 1, which devices can be used to prevent the mobile part 1 from coming into contact with or even damaging walls or other objects positioned in a room. For a collision-prevention device 10 of this type it is possible, for example, to use a laser area radar.

Moreover, this example also uses two receivers 6 for laser guidance beams, the receiving axes of which are at right angles to one another.

Figure 3:
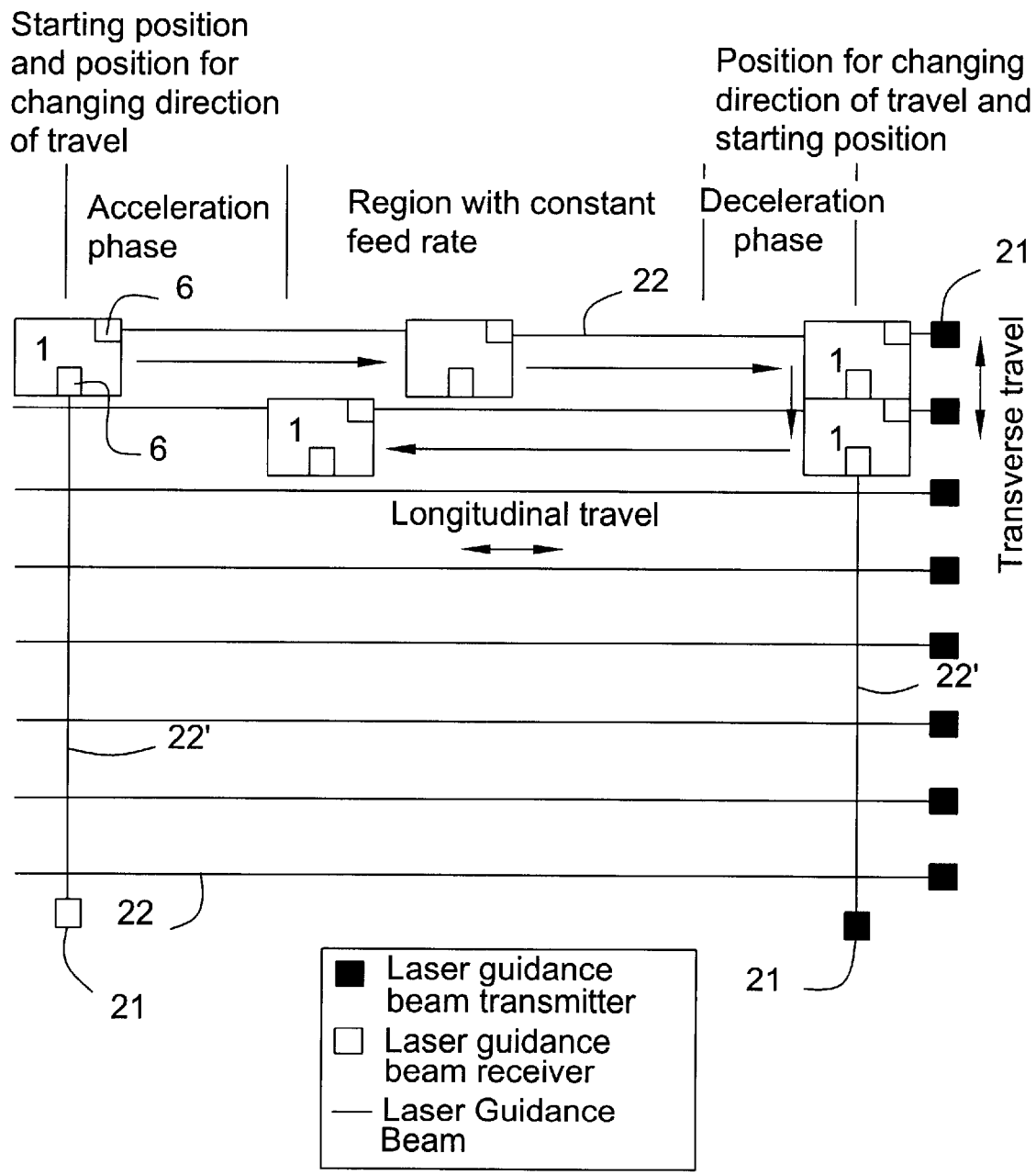
FIG. 3 shows a guidance beam system for controlling the movement of a device according to the invention.

This receiving system 6 can be used to achieve controlled movement of the mobile part 1 using laser guidance beams, as indicated by FIG. 3.

In this case, it is possible for a plurality of laser guidance beam transmitters 21 to be arranged in a room and for the mobile part 1 accordingly to be moved parallel to these laser guidance beams. Consequently, in FIG. 3 a number of laser guidance beam transmitters 21 are arranged in a row, emitting laser guidance beams 22 which are oriented parallel to one another for longitudinal travel. At each of the outer edges of the floor area to be machined, a further laser guidance beam transmitter 21 is arranged at right angles to the first set of transmitters 21, these further transmitters each emitting a laser guidance beam 22' which is oriented at right angles to the other laser guidance beams 22, by means of which further laser guidance beam 22' stopping is initiated at the corresponding outer floor areas to be machined, and a corresponding movement, as indicated by the double arrow "transverse travel", is initiated, and this transverse travel is ended as a result of detection of the corresponding laser guidance beam receiver of the next parallel laser light beam 22, and the mobile part 1 then performs longitudinal travel in the opposite direction.

Naturally, it is also possible to use other guidance beam systems instead of the laser guidance beams.

Figure 4:
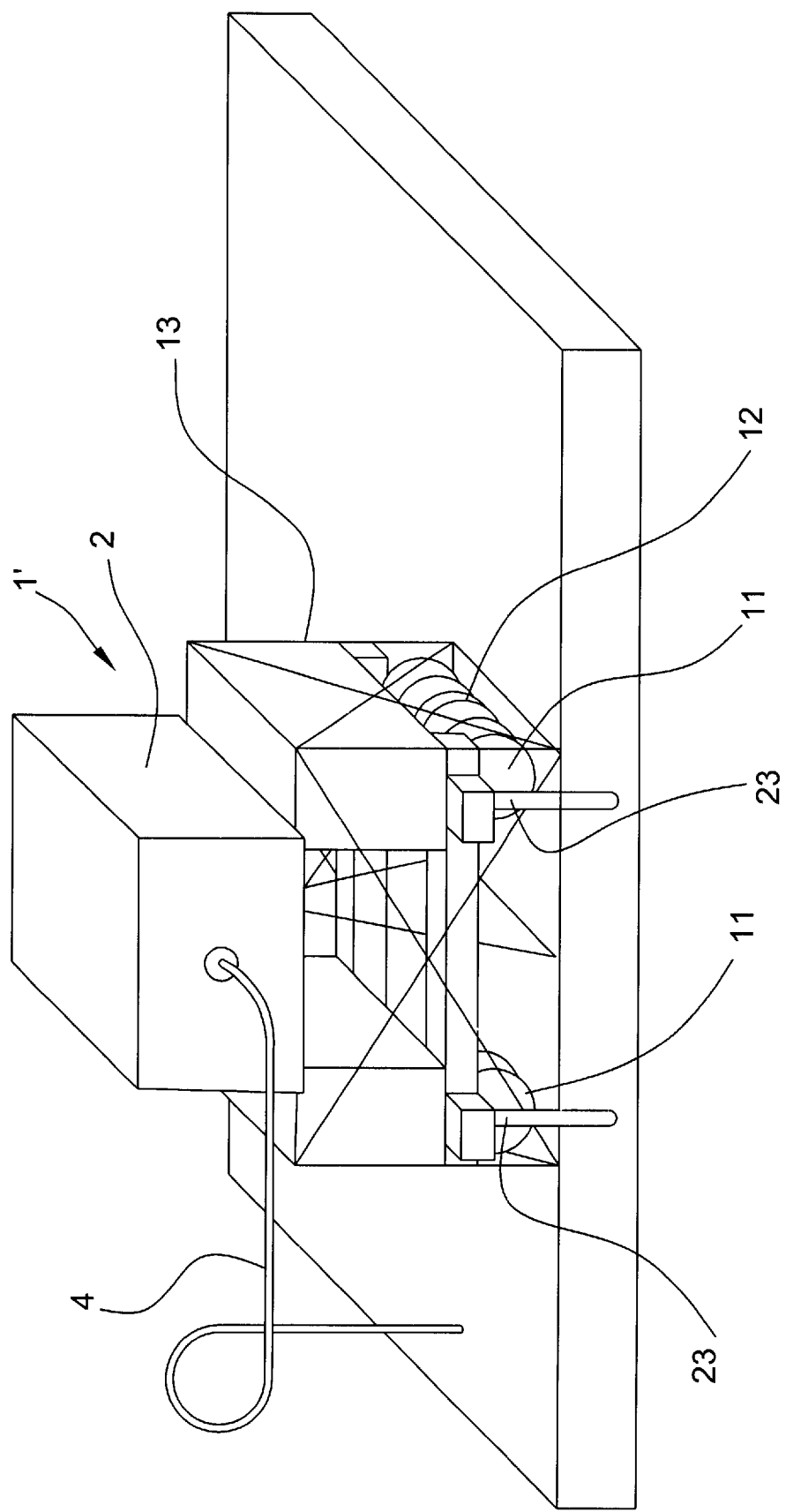
FIG. 4 shows a mobile part for forming structuring on steps.

FIG. 4 illustrates an example of a mobile part 1' which is suitable in particular for machining steps. In this case, the mobile part 1' of the device is arranged separately from the laser light source 5, and the laser beam is guided to the mobile part 1' via an optical fiber 4. Elements for beam guidance and beam shaping, such as for example a galvo scanner head 2, are accommodated in the mobile part 1', by means of which elements the desired structuring can be formed on the surface of a step.

Once again a travelling unit 11, in this case with three individual wheels, at least one of which is driven, is present on the mobile part 1'. Since a step of this type is preferably to be machined continuously, there is an undriven measuring wheel 12 which is used to detect the movement speed, which can be taken into account for controlling the laser beam.

In the critical machining area, the mobile part 1' is once again provided with a laser protection device 13 which can be used to protect the surrounding area.

Moreover, there are two stop rollers 23 on the mobile part 1', which are designed and dimensioned in such a way that they form a guide on the front edge of the step. Since it is very much the front part of a step which is critical in terms of nonslip properties, it is sufficient if the mobile part 1', to form the structuring, is guided once over the entire width of the step and the, structuring with the microcraters is formed in this area, and consequently changes in the direction of movement are not required.

Since the two stop rollers 23 form a safe guide at the front edge of the step, it may be advantageous for at least one of the wheels of the travelling unit 11 to be set at a slight angle to the front edge of the step, leading to the generation of a force which ensures that the two stop rollers 23 remain in continuous contact with the front edge of the step.

FIG. 5 diagrammatically depicts a structure showing how the laser beam can be deflected using the so-called vector technique. For this purpose, the laser beam 3 from a laser light source 5 is directed via two laser scanner mirrors 2', which can pivot at right angles to one another, onto the surface which is to be machined, it being possible to reach any desired point in a predetermined area by the combination of mirror rotations and to form a corresponding microcrater at these points. In this case, the rotational movements of the scanner mirrors 2' should be synchronized with the pulse frequency of a pulsed laser light source 5. With a vector technique of this nature, it is possible to generate controlled microcraters arranged in rows and columns, but also in an arbitrary arrangement, and it is also readily possible to obtain two-dimensional and three-dimensional pictorial representations with corresponding structuring.

For continuous operation, the raster technique is recommended for the corresponding beam deflection, one possible option being illustrated in FIG. 6. In the example shown here, the laser beam 3 from a laser light source 5 is once again deflected using a rotatable laser scanner mirror 2' and is directed onto a rotating polygon wheel 2", from the individual reflective surfaces of which the laser beam is intermittently directed onto the surface to be machined; in this case, the pulse frequency of the laser light source 5 should be synchronized with the rotational speed of the polygon wheel 2", taking into account the particular rotational angle of the scanner mirror 2' and of the polygon wheel 2".

What is claimed is:

1. A device for structuring the surface of floor coverings which have already been laid, comprising at least one laser beam which can be moved with controlled intensity in at least one dimension across the surface to be structured; a mobile part; a displaceable element which can be displaced with respect to the mobile part in two axes which are oriented perpendicular to one another, the displaceable element accommodated in the mobile part; and at least one optical element for guiding and shaping the at least one laser beam, the at least one optical element arranged on the displaceable element.

2. The device as claimed in claim 1, wherein at least one proximity sensor is provided on the mobile part of the device.

3. The device as claimed in claim 1, wherein a protective device which is transparent to the laser radiation used is arranged between the surface to be structured and thee at least one optical element for guiding and shaping the laser beam(s) in the beam direction.

4. The device as claimed in claim 3, wherein the protective device is selected from a group consisting of an exchangeable protective panel, a protective panel provided with a longitudinal incision, a sheet, a cross-jet system, a suction system and any combination thereof.

5. The device as claimed in claim 1, wherein the at least one laser beam is transmitted at least in part via optical fibers.

6. The device as claimed in claim 1, wherein the at least one laser beam can be guided or moved in a controlled manner over the surface which is to be structured.

7. The device as claimed in claim 1, wherein the at least one laser beam is controlled as a function of the speed or the position of the mobile part of the device.

8. The device as claimed in claim 1, wherein the beam of a laser light source can be split by at least one beam splitter into at least two laser beams which can be used for structuring.

9. The device as claimed in claim 8, wherein the laser light source is a pulsed laser.

10. The device as claimed in claim 8, wherein the beam is transmitted by a mirror system, optical fibers, or a combination thereof.

11. The device as claimed in claim 1, wherein a guidance system, navigation system, image-processing system, or a combination thereof is provided for controlling the movement of the mobile part of the device.

12. The device as claimed in claim 1, wherein an image-processing system which records the structure formed is provided.

13. The device as claimed in claim 1, further including an integral device for cleaning the structured surface. wherein an image-processing system which records the structured surface.

14. The device as claimed in claim 1, wherein therein at least one collision-prevention system on the mobile part.

15. The device as claimed in claim 1, wherein the mobile part of the device can be guided or moved in a controlled manner over the surface which is to be structured.

16. The device as claimed in claim 1, wherein a guidance system, navigation system, image-processing system, or combination thereof is provided for controlling the positioning of the mobile part of the device.

17. A method for structuring the surface of floor coverings which have already been laid using at least one laser beam, which can be moved with controlled intensity in at least two dimensions across the surface which is to be structured, wherein a mobile part of a device having an element which is arranged thereon and can be displaced with respect to the mobile part in two axes which are oriented perpendicular to one another, in which mobile part at least the elements for guiding and shaping the at least one laser beam are accommodated, is moved in a defined way over the surface to be structured or is positioned in that area, and the at least one laser beam is controlled as a function of the speed or position.

18. The method as claimed in claim 17, wherein the surface is cleaned after the structures have been formed.

19. The method as claimed in claim 18, wherein the thermal of the cooling water or the cooling air of the laser light source or a combination thereof is used for cleaning.

20. The method as claimed in claim 17, wherein before the structuring is formed the composition of the material to be structured is determined with regard to its absorption and reflection properties, and the laser parameters are adjusted accordingly.

21. The method as claimed in claim 17, wherein the structuring is designed in the form of microcraters, which act as displacement space for slip-promoting media, of a size which is not visible to the human eye at a distance of at least 1 meter, so that the visual appearance of the surface is scarcely affected.

22. The method as claimed in claim 17, wherein the structuring is designed in predeterminable rasters in which structured areas and unstructured areas are arranged alternately.

23. The method as claimed in claim 17, wherein the structuring is designed in the form of predeterminable, two-dimensional pictorial representations.

24. The method as claimed in claim 23, wherein a three-dimensional effect is achieved for the two-dimensional pictorial representations by influencing the size and depth of the structures.

25. The method as claimed in claim 17, wherein the speed or the acceleration of the movement of the mobile part is measured using an undriven wheel.

26. The method as claimed in claim 17, wherein the laser light source is switched off by a safety switch when the at least one laser beam is directed at areas which lie outside a protected area of the device.

27. The method as claimed in claim 17, wherein the laser light source is switched off when a proximity sensor measures a distance which goes beyond a predeterminable limit.

28. The method as claimed in claim 17, wherein the chamber of the device in which the optical elements for guiding and shaping the laser beam(s) are accommodated can be subjected to a pressure which is above ambient pressure.

29. The method as claimed in claim 17, wherein the movement of the mobile part is controlled by a guidance beam system.

30. The method as claimed in claim 17, wherein for discontinuous working the movement and positioning of the mobile part is controlled by an electronic image processing system, which is used to record the pattern of a floor covering formed from individual slab-like elements.

31. The method as claimed in claim 17, wherein the deflection of the laser beam(s) is carried out using a vector or raster technique in order to form the structures on the surfaces.

32. The method as claimed in claim 17, wherein the laser power, the focusing onto the surface to be structured, or a combination thereof is controlled as a function of the measured distance from the surface to be structured.

33. The method as claimed in claim 17, wherein, before the structures are formed, a layer of a medium which exhibits relatively high absorption with respect to the laser radiation used is temporarily applied to the surface to be structured.

* * * * *